United States Patent
Tsai et al.

(10) Patent No.: US 9,613,757 B2
(45) Date of Patent: Apr. 4, 2017

(54) CONDUCTIVE POLYMER COMPOSITE AND PREPARATION AND USE THEREOF

(71) Applicants: ETERNAL CHEMICAL CO., LTD., Kaohsiung (TW); GEMMY ELECTRONIC CO., LTD., Taipei (TW)

(72) Inventors: Lin Jen Tsai, Kaohsiung (TW); Shinn-Horng Chen, Kaohsiung (TW); Chieh-Fu Lin, Taipei (TW)

(73) Assignee: ETERNAL MATERIALS CO., LTD., Kaohsiung (TW)

( * ) Notice: Subject to any disclaimer, the term of this patent is extended or adjusted under 35 U.S.C. 154(b) by 227 days.

(21) Appl. No.: 13/955,179

(22) Filed: Jul. 31, 2013

(65) Prior Publication Data
US 2014/0036415 A1    Feb. 6, 2014

(30) Foreign Application Priority Data
Aug. 1, 2012  (TW) .............................. 101127893 A

(51) Int. Cl.
C08G 75/00    (2006.01)
H01G 9/028    (2006.01)
(Continued)

(52) U.S. Cl.
CPC ........... *H01G 9/028* (2013.01); *H01G 9/0036* (2013.01); *H01G 9/151* (2013.01); *Y10T 428/2982* (2015.01)

(58) Field of Classification Search
CPC ................................ C08G 2261/44; H01G 9/00
See application file for complete search history.

(56) References Cited

U.S. PATENT DOCUMENTS

| 4,910,645 A | 3/1990 | Jonas et al. |
| 5,300,575 A | 4/1994 | Jonas et al. |

(Continued)

FOREIGN PATENT DOCUMENTS

| CN | 101977960 A | 2/2011 |
| EP | 0 440 957 A2 | 8/1991 |

(Continued)

OTHER PUBLICATIONS

Bruno et al., Biomacromolecules 2006, 7, 586-589.*

(Continued)

*Primary Examiner* — Shane Fang
(74) *Attorney, Agent, or Firm* — Ladas & Parry LLP

(57) ABSTRACT

The invention pertains to a conductive polymer composite comprising:
(a) a conductive polymer and (b) a polyanion, wherein the conductive polymer comprises polymerized units derived from a monomer of formula (I):

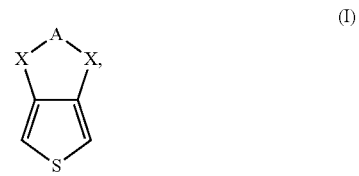

(I)

wherein:
A is a C1-C4 alkylene group substituted with $(R)_p$;
X is O or S;
R is H, an unsubstituted or substituted $C_1$-$C_{20}$ alkyl or alkoxy, or an unsubstituted or substituted $C_6$-$C_{20}$ aryl; and (Continued)

p is 0, 1, or 2, and the conductive polymer has a weight average molecular weight ranging from 3,000 to 30,000. A process for preparing the conductive polymer composite is also provided.

9 Claims, 1 Drawing Sheet

(51) Int. Cl.
*H01G 9/00* (2006.01)
*H01G 9/15* (2006.01)

(56) References Cited

U.S. PATENT DOCUMENTS

| | | |
|---|---|---|
| 7,684,172 B2 | 3/2010 | Kasuga et al. |
| 8,721,928 B2 | 5/2014 | Jonas et al. |
| 2010/0009066 A1 | 1/2010 | Sandberg et al. |
| 2011/0049433 A1 | 3/2011 | Jonas et al. |
| 2011/0049435 A1 | 3/2011 | Wakizaka et al. |
| 2011/0190461 A1 | 8/2011 | Kita et al. |
| 2012/0081840 A1 | 4/2012 | Matsuoka et al. |

FOREIGN PATENT DOCUMENTS

| | | |
|---|---|---|
| JP | 2009-147122 A | 7/2009 |
| JP | 2006-280654 A | 12/2009 |
| JP | 2010-265520 A | 11/2010 |
| JP | 2011-510141 A | 3/2011 |
| JP | 2011-252055 A | 12/2011 |
| KR | 10-2008-0048406 A | 6/2008 |
| KR | 10-2011-0014554 A | 2/2011 |
| TW | 201030048 A1 | 8/2010 |
| WO | 2010/007648 A1 | 1/2010 |
| WO | 2011/075644 A2 | 6/2011 |

OTHER PUBLICATIONS

Non-English Office Action dated Sep. 3, 2014 for Korean Application No. 10-2013-0090608 with English translation.
Espacenet English abstract of KR 10-2008-0048406 A.
Non-English Notice of Reasons for Rejection dated Jul. 31, 2014 for Japanese Application No. 2013-158685 with English translation.
Search Report dated May 13, 2014 for Taiwanese Application No. 101127893 with English translation.
Espacenet English abstract of WO 2011/075644 A2.
Espacenet English abstract of JP 2010-265520 A.
Espacenet English abstract of WO 2010/007648 A1.
Espacenet English abstract of JP 2006-280654 A.
Espacenet English abstract of JP 2011-510141 A.
Espacenet English abstract of JP 2011-252055 A.
Espacenet English abstract of CN 101977960 A.
Espacenet English abstract of 2009-147122 A.
Non-English Office Action dated Dec. 15, 2014 for Taiwan Application No. 101127893 with English translation.
Espacenet English abstract of TW 201030048 A1.
Non-English Action dated Jan. 11, 2016 for German Application No. 10 2013 215 109.8 with English translation.
Zhong, X, et al., "Synthesis and Characterization of Poly(3,4-ethylenedioxythiophene) Nanoparticles Obtained Through Ultrasonic Irradiation", Journal of Applied Polymer Science, vol. 118, 2010, pp. 2146-2152.

* cited by examiner

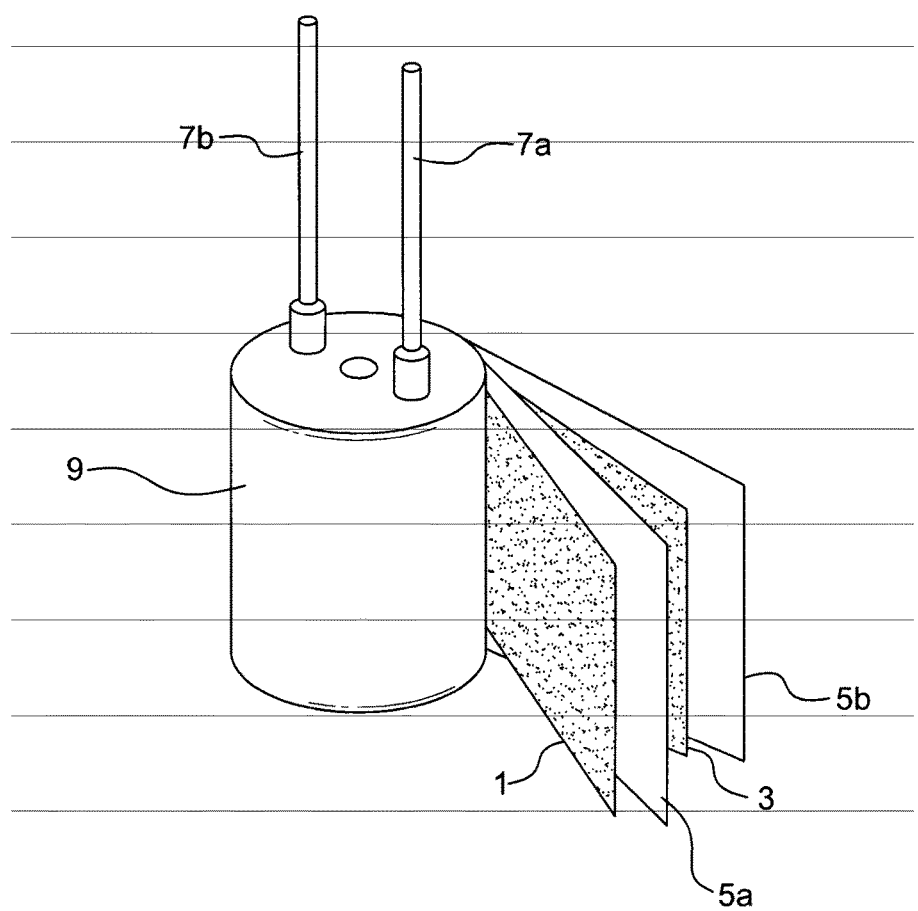

CONDUCTIVE POLYMER COMPOSITE AND PREPARATION AND USE THEREOF

BACKGROUND OF THE INVENTION

Field of the Invention

The present invention relates to a conductive polymer composite, in particular, a conductive polymer composite useful for solid capacitors. The present invention also relates to a method for preparing the conductive polymer composite and to a solid capacitor using the conductive polymer composite.

Description of the Related Art

Capacitors are a type of electronic elements that are widely used in various electronic products. With advancement in technology development, electronic products are being developed in the direction of miniaturization and light weight, and the capacitors used in electronic products are required to be miniaturized and have a high capacitance and low impedance when being used at a high frequency.

Capacitors may be classified into conventional liquid capacitors and newly developed solid capacitors. In the electrolyte of early-stage aluminum liquid capacitor, a liquid electrolyte is used as a charge transfer substance. The main components of the liquid electrolyte include a high-boiling point alcohol, an ionic liquid, boric acid, phosphoric acid, an organic carboxylic acid, an ammonium salt, a high-polarity organic solvent, and a small amount of water. The components not only serve as charge transfer substances, but also have the function of patching a dielectric layer of aluminum oxide on an aluminum foil. If the internal aluminum metal is exposed due to defects on the dielectric layer of aluminum oxide, during the charge and discharge process of the capacitor, the electrolyte may react with the exposed aluminum metal and aluminum oxide is generated, thus achieving the patching function. However, although the conventional aluminum liquid capacitor can meet the requirement of high capacitance at a low cost, as the electrolyte used is a liquid, it has the disadvantages of low conductivity and poor high temperature resistance; moreover, in the process of aluminum oxide generation, hydrogen is also generated, and if excessive hydrogen is accumulated in the capacitor, capacitor rupture can easily occur, which will damage the electronic product. Although a hydrogen absorbing agent may be added to the liquid electrolyte to reduce the risk of capacity rupture, the problem is not eliminated. Moreover, although conventional liquid capacitors have higher capacitance, their applications are limited due to exhibiting a higher equivalent series resistance (ESR).

Accordingly, a new generation of solid capacitor is developed, in which the liquid electrolyte is directly replaced by a solid electrolyte. Conductive polymer has been developed as one kind of solid electrolytes. Anions of an oxidant are blended in the structure of the polymer as a dopant and holes are formed, so that the polymer has conductivity. Compared with the liquid electrolyte or a solid semiconductor complex salt such as tetracyanoquinodimethane (TCNQ) composite salt and inorganic semiconductor $MnO_2$ used in conventional electrolyte capacitor, the conductive polymer has a higher conductivity and a suitable high-temperature insulation property, so the conductive polymer has propelled the development of the trend of using solid electrolyte in current electrolytic capacitors.

In addition to having long service life that is 6 times longer than that of a common capacitor, the solid capacitor has improved stability and its capacitance is not easily influenced by an ambient temperature and humidity in use. Additionally, the solid capacitor has the advantage of a low ESR, a low capacitance variation rate, an excellent frequency response (high frequency resistance), a high temperature resistance, and a high current resistance, and the problem of leakage and explosion is eliminated.

Jesse S. Shaffer et al disclose a method of using a conductive polymer in an electrolyte of an electrolytic capacitor for the first time in U.S. Pat. No. 4,609,971. The method includes immersing an anode aluminum foil of a capacitor in a mixture solution formed by a conductive polymer polyaniline powder and a dopant $LiClO_4$, and then removing the solvent on the aluminum foil. Due to its excessively high molecular weight, polyaniline cannot permeate into micropores of the anode foil, so the impregnation rate of the capacitor obtained through this method is poor, and the impedance is high. Then, in order to enable the polymer to easily permeate into the micropores of the anode foil, Gerhard Hellwig et al disclose a chemical oxidation polymerization method of using a conductive polymer as an electrolyte of a capacitor in U.S. Pat. No. 4,803,596. The method includes respectively immersing a capacitor anode foil in a solution of a conductive polymer monomer and an oxidant, and polymerizing the conductive polymer monomer at a suitable condition, in which the conductive polymer electrolyte is accumulated to a sufficient thickness through multiple immersions. Thereafter, Friedrich Jonas et al of the Bayer Corporation in Germany disclose a method of manufacturing an aluminum solid capacitor with poly-3,4-ethylenedioxythiophene (PEDOT) as an electrolyte by using a monomer 3,4-ethylenedioxythiophene (EDOT) in combination with an oxidant iron (III) p-toluenesulfonate for the first time in U.S. Pat. No. 4,910,645. Moreover, it has been found that 3,4-ethylenedithiathiophene (EDTT) which is structurally related to EDOT can be converted to electroactive polymer (see Lambertus Groenendaal et. al, *Adv. Mater.* 2000, 12, No. 7).

The conductive polymer PEDOT has the advantages of a high heat resistance, a high conductivity, a high charge transfer velocity, being non-toxic, a long service life, and no occurrence of capacitor explosion when being applied in a capacitor. In industry, PEDOT is directly produced from the polymerization reaction of the monomer EDOT with iron p-toluenesulfonate in a capacitor. Such production involves an in situ reaction and can be classified into one-part method, two-part method, and multi-part method according to the immersing manners. One-part method includes immersing a capacitor element in a mixture solution of EDOT and iron p-toluenesulfonate, and conducting the polymerization with heat. Two-part method includes separately immersing a capacitor element with EDOT and iron p-toluenesulfonate, and then conducting the polymerization with heat. Nevertheless, for one-part method, the processing parameters should be carefully controlled so as to avoid the polymerization of EDOT before the immersion. As for the two-part method, the problem associated with solution contamination is easy to occur.

In addition, the PEDOT on the aluminum foil surface or pores that is polymerized through an in situ reaction mostly has a powder structure with a lower polymerization degree, and the physical properties of the powder structure are poor, so the powder structure cannot be easily adhered on the aluminum foil surface or pores as it is more likely to fall off from the surface or pores, which results in a limited withstand voltage and disallow the solid capacitor to exhibit a voltage of 16 V or higher.

To solve the above-mentioned problem, Stephan Kirchmeyer et al proposed synthesizing a conductive polymer by an ex situ polymerization reaction (*J. Mater. Chem.* 2005, 15, 2077-2088). Nevertheless, the polymer obtained from an ex situ polymerization reaction normally has the drawbacks of composing of less repeating units (composing of about 6 to 18 repeating units) and exhibiting a lower polymerization degree (exhibiting a weight average molecular weight of approximately less than 2500). Such a lower polymerization degree polymer cannot be utilized in a working environment requiring a high voltage.

Accordingly, the industry calls for the development of a conductive polymer with a higher polymerization degree and smaller particle size distribution for being applied in solid capacitors that can withstand a higher voltage and have good stability, so as to be useful in current electronic products that require to be miniaturized and have a high capacitance, high-temperature resistance and low impedance when being used at a high frequency.

SUMMARY OF THE INVENTION

According to one aspect, the present invention provides a conductive polymer composite comprising (a) a conductive polymer and (b) a polyanion.

According to another aspect, the present invention provides a method for preparing the above-mentioned conductive polymer composite.

According to yet another aspect, the present invention provides a solid capacitor, comprising:
an anode;
a dielectric layer formed on the anode;
a cathode; and
a solid electrolyte located between the dielectric layer and the cathode, wherein the solid electrolyte comprises the conductive polymer composite according to the present invention.

BRIEF DESCRIPTION OF THE DRAWING

FIG. 1 shows a capacitor element according to an embodiment of the present invention.

DETAILED DESCRIPTION OF THE INVENTION

To have a better understanding about the disclosure herein, some terms are defined as follows.

By the term "about," it means the acceptable deviation of a value determined by a person having ordinary skill in the art, partly depending on how to calculate or determine the value.

By the term "alkyl," it means a straight or branched carbon chain radical. In some embodiments, alkyl is a carbon chain radical having 1 to 20 carbons ($C_{1-20}$), 1 to 15 carbons ($C_{1-15}$), 1 to 10 carbons ($C_{1-10}$), or 1 to 6 carbons ($C_{1-6}$). Examples of alkyl include, but are not limited to, methyl, ethyl, propyl (including all the isomer forms), butyl (including all the isomer forms), pentyl (including all the isomer forms), and hexyl (including all the isomer forms).

By the term "alkylene," it means a divalent, straight or branched carbon chain radical. In some embodiments, alkylene is a carbon chain radical having 1 to 4 carbons ($C_{1-4}$). Examples of alkylene include, but are not limited to, methylene, ethylene, propylene (including all the isomer forms), and butylene (including all the isomer forms).

By the term "alkoxy," it means an alkyl as described above that is attached with an oxygen atom. Examples of alkoxy include, but are not limited to methoxy, ethoxy, propoxy, n-propoxy, 2-propoxy, n-butoxy, iso-butoxy, and tert-butoxy.

By the term "aryl," it means mono-cyclic or multi-cyclic, monovalent aromatic radical. In some embodiments, an aryl has 6 to 20 ($C_{6-20}$), 6 to 15 ($C_{6-15}$), or 6 to 10 ($C_{6-10}$) ring atoms. Examples of aryl include, but are not limited to, phenyl, naphthyl, fluorenyl, azulenyl, anthracyl, phenanthryl, pyrenyl, biphenyl, and terphenyl. It also means a bicyclic or tricyclic carbon ring, one of whose rings is an aromatic ring and the other one or two rings are saturated, partially unsaturated, or aromatic rings, such as dihydronaphthyl, indenyl, dihydroindenyl, and tetrahydronaphthyl.

Some embodiments according to the present invention will be illustrated as follows. However, without departing from the spirit of the invention, the invention also encompasses various practical embodiments and should not be construed to be limited to those described in the specification. Moreover, unless otherwise described, "a," "an," or "the" or the like will represent singular or plural form. The term "substituted" represents that a hydrogen is replaced by a substituent, and said substituent can be any group or element other than hydrogen. In addition, for the sake of clarity, the sizes of the elements and regions shown in the drawing can be magnified, rather than being drawn according to the actual proportion.

Conductive Polymer Composite

The conductive polymer composite according to the present invention comprises (a) a conductive polymer and (b) a polyanion.

The above-mentioned conductive polymer comprises polymerized units derived from a monomer of formula (I):

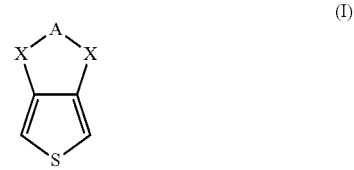

(I)

wherein A is a $C_{1-4}$ alkylene substituted by $(R)_p$ and X is O or S, where R is independently H, unsubstituted or substituted $C_{1-20}$ alkyl or alkoxy, or unsubstituted or substituted $C_{6-20}$ aryl, and p is 0, 1 or 2.

The monomer (a) preferably includes, but is not limited to

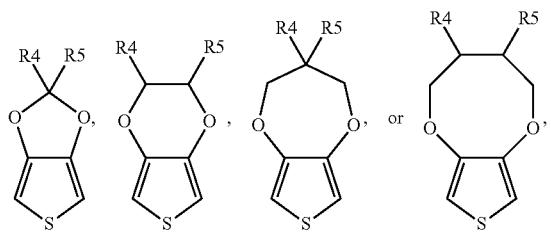

or a combination thereof, wherein R4 and R5 each independently represent H, unsubstituted or substituted $C_{1-15}$ alkyl or alkoxy, or unsubstituted or substituted $C_{6-15}$ aryl. Preferably, R4 and R5 each independently represent H or $C_{1-3}$ alkyl or alkoxy.

According to an embodiment of the present invention, the monomer (a) is

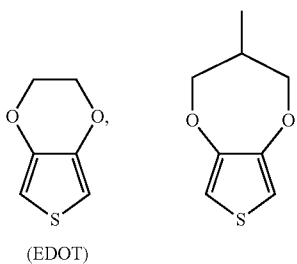

(EDOT)

(3-methyl-3,4-dihydro-2H-thieno[3,4-b][1,4]dioxepine), or

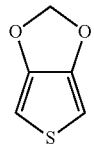

(thieno[3,4-d][1,3]dioxole), or a combination thereof.

The conductive polymer can be a homopolymer or a copolymer. The monomers to be polymerized for forming the conductive polymer may include only a monomer of formula (I) or include not only the monomer of formula (I) but also another monomer, such as a monomer of the following formula (II).

According to a preferred embodiment of the present invention, to increase the polymerization degree and improve the capacitance of the conductive polymer, the conductive polymer further comprises polymerized units derived from a monomer of formula (II):

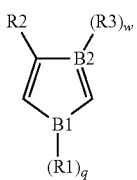

(II)

wherein, B1 is O, S or N; B2 is N or C; R1, R2 and R3 each independently represent H, unsubstituted or substituted $C_{1-20}$ alkyl or alkoxy, or unsubstituted or substituted $C_{6-20}$ aryl, and q and w each independently represent an integer of 0 or 1 (when B1 is O or S, q is 0; and when B2 is N, w is 0).

Preferred monomers of formula (II) include, but are not limited to

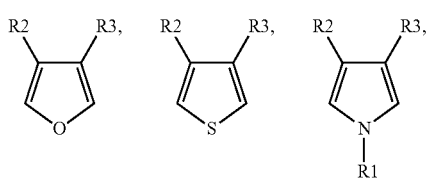

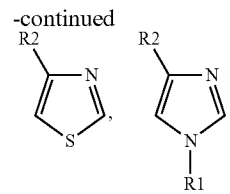

or a combination thereof, wherein R1, R2, and R3 each independently represent H or $C_{1-3}$ alkyl or alkoxy.

According to some embodiments of the present invention, the monomer of formula (II) is

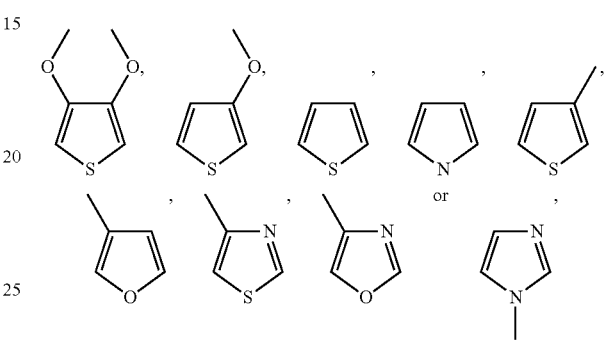

or a combination thereof.

The conductive polymer according to the present invention exhibits a high degree of polymerization and has a weight average molecular weight ranging from 3,000 to 30,000, preferably from 4,000 to 18,000, and more preferably from 5,000 to 16,000.

When being used in the preparation of the conductive polymer according to the present invention, the proportions of the monomer of formula (I) and the monomer of formula (II) are not particularly limited and the monomers can be formulated as desired. However, if the amount of the monomer of formula (II) is overly high, the capacitance of the resultant capacitor may be adversely affected. Therefore, if present, the monomer of formula (II) is normally used in an amount of about 1 part by weight to about 800 parts by weight, preferably about 5 parts by weight to about 400 parts by weight, based on 100 parts by weight of the monomer of formula (I). According to some embodiments of the present invention, the monomer of formula (II) is used in an amount of about 5 parts by weight to about 50 parts by weight, based on 100 parts by weight of the monomer of formula (I).

The polyanion component (b) useful for the present invention is not particularly limited and can be any species known in the art. By using the polyanion during the polymerization reaction, an originally water insoluble polythiophene can become easier to be dispersed in water or become aqueous. The polyanions useful in the present invention can be acidic polymers in a free acid form, which include, but are not limited to, a polycarboxylic acid, a polysulfonic acid, or a combination thereof. The polycarboxylic acid can be, for example, polyacrylic acid, polymethacrylic acid or polymaleic acid; the polysulfonic acid can be, for example, polystyrene sulfonic acid or polyvinyl sulfonic acid, in which the polystyrene sulfonic acid is preferred in terms of conductivity. A polyanion in a salt form, with the acidic moiety being neutralized, can also be utilized in the present invention.

The weight average molecular weight of the above-mentioned polycarboxylic acid or polysulfonic acid served as the polyanion is not particularly limited, but is preferably in the range from about 10,000 to about 150,000, more preferably from about 70,000 to about 100,000.

According to the present invention, the ratio by weight of component (a) to component (b) is from about 0.05 to about 10, preferably from about 0.1 to about 8, and more preferably from about 0.2 to about 5.

The conductive polymer composite according to the present invention has a particle size in the range from about 10 nm to about 400 nm, preferably from about 30 nm to about 300 nm, and more preferably from about 50 nm to about 200 nm.

The conductive polymer composite according to the present invention has a surface resistivity in the range from about 100 to about 1,000Ω/□ (Ω/□ represents ohms/square), preferably from about 150 to about 850Ω/□, and more preferably from about 200 to about 750Ω/□.

Preparation of the Conductive Polymer Composite

The present invention further provides a process for preparing the above-mentioned conductive polymer composite comprising the following steps:

(a) mixing a monomer of formula (I):

(I)

and
optionally a monomer of formula (II):

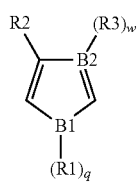

(II)

with a polyanion,
wherein:
A is a $C_{1-4}$ alkylene substituted by $(R)_p$, where R is independently H, unsubstituted or substituted $C_{1-20}$ alkyl or alkoxy, or unsubstituted or substituted $C_{6-20}$ aryl, and p is 0, 1 or 2,
X is O or S,
B1 is O, S or N,
B2 is N or C,
R1, R2 and R3 each independently represent H, unsubstituted or substituted $C_{1-20}$ alkyl or alkoxy, or unsubstituted or substituted $C_{6-20}$ aryl, and
q and w each independently represent an integer of 0 or 1;

(b) subjecting the mixture obtained from step (a) to a first ultrasonic agitation to form micelles;
(c) adding an oxidant so that the monomers can undergo oxidation polymerization on the polyanion which serves as a template so as to form a composite with the polyanion; and
(d) subjecting to a second ultrasonic agitation.

The species, preferred embodiments, and amounts of the monomer of formula (I), the monomer of formula (II), and the polyanion used in step (a) are as those described hereinbefore.

According to the present invention, step (a) can be conducted at room temperature; the polyanion is an acidic polymer in free acid form, which can be obtained by adding an acidic polymer to a solvent to form a solution and then dissolving said acidic polymer in the solution. The acidic polymer is as that described hereinbefore.

The solvent useful in the present invention is not particularly limited in principle, which for example, can be water, alcohols, or benzenes, or combinations thereof, preferably methanol, ethanol, propanol, n-butanol, tert-butanol, or water, or combinations thereof, and more preferably water.

In the present invention, the polyanion can be used as a template, and after the polyanion is thoroughly mixed with the monomer of formula (I) and optionally the monomer of formula (II), micelles can be formed upon a first ultrasonic agitation of the resultant mixture so that the monomers can be encapsulated therein.

The micelles produced in step (a) have a particle size on the order of micrometers or larger. However, if the micelles is overly large, the subsequently obtained conductive polymer could be too large to be permeated into the micropores of an anode foil during immersing. The inventors discovered that by separately using a first ultrasonic agitation and a second ultrasonic agitation in ice bath condition (about 0° C.), the size of the desired polymer composite can be effectively reduced to the order of nanometers and the resultant conductive polymer composite can have excellent conductivity.

Step (b) of the method according to the present invention is related to the reduction in the size of the micelles by the first ultrasonic agitation before conducting the oxidation polymerization. According to a comparative example provided in the present application, if the ultrasonic agitation is conducted only after the oxidation polymerization, the size of the resultant polymer composite cannot be reduced to the order of nanometers.

The above-mentioned first ultrasonic agitation is conducted at the frequency ranging from about 10 kHz to about 50 kHz, preferably from about 15 kHz to about 45 kHz, and more preferably from about 20 kHz to about 40 kHz. The duration time of said first ultrasonic agitation ranges from about 1 min to about 100 min, preferably from about 5 min to about 50 min, and more preferably from about 20 min to about 40 min.

In step (c), the monomers can be formed into a conductive polymer through an oxidation polymerization in the presence of an oxidant. The resultant conductive polymer is positively charged due to the oxidation polymerization and can be formed into a polymer composite together with the negatively charged polyanion.

The oxidants useful in the present invention are not particularly limited and can be those well known to a person of ordinary skill in the art, which include, but are not limited to, alkali metal persulfates, ammonium salts, peroxides, or ferric salts of organic acids, or the combination thereof. Preferably, the oxidant is iron (III) p-toluenesulphonate, ammonium sulfate, ammonium persulfate, ammonium oxalate, ammonium perchlorate, or hydrogen peroxide or a mixture thereof, more preferably, the oxidant is iron (III) p-toluenesulfonate or hydrogen peroxide, and most preferably, the oxidant is hydrogen peroxide.

The oxidant can be used in an amount of about 5 parts by weight to about 3000 parts by weight, preferably about 50 parts by weight to about 1000 parts by weight, and more preferably about 100 parts by weight to about 300 parts by weight, based on 100 parts by weight of the total amounts of the monomer of formula (I) and optionally the monomer of the formula (II).

Conventional conductive polymers obtained by ex situ polymerization techniques normally do not have a high degree of polymerization and normally exhibit a weight average molecular weight of less than 2500. The conductive polymer according to the present invention has a high degree of polymerization and can have a weight average molecular weight ranging from 3,000 to 30,000, preferably from 4,000 to 18,000, and more preferably from 5,000 to 16,000.

The temperature for the oxidation polymerization is not particularly limited and can be in the range from 20° C. to 80° C., and preferably from 40° C. to 60° C. The oxidation polymerization is normally conducted in a time period ranging from about 1 hour to 10 hours, and preferably from 5 hours to 7 hours.

By the second ultrasonic agitation in step (d), the size of the polymer composite obtained from step (c) can be further reduced, and the conductive polymers can be exposed outside the template to facilitate their effective filling into the surface or pores of an dielectric layer during the subsequent step of immersing a capacitor.

The above-mentioned second ultrasonic agitation is conducted at the frequency ranging from about 10 kHz to about 50 kHz, preferably from about 15 kHz to about 45 kHz, and more preferably from about 20 kHz to about 40 kHz. The duration time of said second ultrasonic agitation ranges from about 1 min to about 100 min, preferably from about 5 min to about 50 min, and more preferably from about 20 min to about 40 min.

The conductive polymer composite according to the present invention has a particle size in the range from about 10 nm to about 400 nm, preferably from about 30 nm to about 300 nm, and more preferably from about 50 nm to about 200 nm.

The conductive polymer composite according to the present invention has a surface resistivity in the range from about 100 to about 1,000Ω/□ (Ω/□ represents ohms/square), preferably from about 150 to about 850Ω/□, and more preferably from about 200 to about 750Ω/□.

According to an embodiment of the present invention, the polymer composite obtained from step (c) has a size ranging from about 400 nm to about 500 nm and the size can be further reduced via the second ultrasonic agitation in step (d) to about 50 nm to about 200 nm.

When being applied to a capacitor, the solution obtained from step (d) can be directly used for immersing the capacitor.

Applications of Conductive Polymer Composite

The conductive polymer composite of the present invention exhibits a high degree of polymerization, and the characteristics of good heat resistance, high conductivity, high charge transfer velocity, being non-toxic, a long service life, and no occurrence of capacitor explosion when being applied in a capacitor. Moreover, the conductive polymer composite exhibits a size on the order of nanometers, a high molecular weight, and good conductivity, and can be effectively filled into the surface or pores of the dielectric layer, and is particularly useful for the preparation of a solid capacitor requiring a high withstand voltage and high capacitance.

As compared to an in situ polymerization, the present invention first prepares a conductive polymer composite before immersing a capacitor and the degree of polymerization of the conductive polymer composite can be easily controlled during the process and avoids the drawbacks associated with the one-part in situ polymerization or two-part in situ polymerization regarding the necessity of careful control of the processing parameters during the immersing.

Given the above, the present invention further provides a solid capacitor, comprising: an anode; a dielectric layer formed on the anode; a cathode; and a solid electrolyte located between the dielectric layer and the cathode, wherein the solid electrolyte comprises the above-mentioned conductive nano polymer composite.

The solid capacitor may be an aluminum solid capacitor, a tantalum solid capacitor, or a niobium solid capacitor.

Specifically, as the main part of the solid capacitor, the anode is formed by, with an etched conductive metal foil as an anode foil, performing anode oxidation processing on a surface of the anode foil and introducing a wire from the anode foil, and the cathode is formed by, with another metal foil as a cathode foil, introducing a wire from the cathode foil. The dielectric layer is formed from an oxide or the like and is formed on the surface of the anode foil, and is located between the anode foil and the cathode foil. The anode foil and the cathode foil are formed from aluminum, tantalum, niobium, aluminum oxide, tantalum oxide, niobium oxide, titanium plated aluminum, or carbon plated aluminum. The anode foil and the cathode foil are wound into a cylinder and immersed in a solution containing the inventive conductive polymer composite, and then the solvent is removed by such as evacuation and heating. If necessary, the above-mentioned steps can be repeated two to three or more times, thereby forming a solid electrolyte between the dielectric layer and the cathode foil of the solid capacitor.

The solution obtained from step (d) of the process according to the present invention can be directly used for the immersing, or the resultant conductive polymer composite is formulated with a suitable second solvent for a subsequent immersing. The species of the second solvent include, but are not limited to, water, alcohols, or benzenes, or combinations thereof, preferably methanol, ethanol, propanol, n-butanol, tert-butanol, and water, and combinations thereof.

After the solid electrolyte is formed in the capacitor element, a solid capacitor may be formed by using conventional technologies and materials. For example, the capacitor element may be installed in a box with a bottom, and a seal element with an opening for exposing the wires may be disposed at the top of the box, and a solid capacitor may be formed after being sealed.

In the following, a method for manufacturing a solid capacitor according to an embodiment of the present invention is described with reference to FIG. 1.

FIG. 1 shows a capacitor element according to an embodiment of the present invention. As shown in FIG. 1, an anode foil 1 and a cathode foil 3 and spacer components 5a and 5b that are inserted between the anode foil 1 and the cathode foil 3 are wound together to form a capacitor element 9. Wires 7a and 7b serve as terminals for connecting the cathode foil 3 and the anode foil 1 to an external circuit.

The number of wires connected to the cathode foil and the anode foil is not particularly limited, provided that the cathode foil and the anode foil both are wire connected. The number of the cathode foils and the anode foils is not particularly limited, either, and for example, the number of the cathode foils may be the same as that of the anode foils, or the number of the cathode foils may be greater than that of the anode foils. The dielectric layer (not shown) formed from an oxide or the like is formed on the surface of the anode foil, and is located between the anode foil and the cathode foil. The anode foil 1, the cathode foil 3, the spacer components 5a and 5b, and the wires 7a and 7b are manufactured by using known materials through known technologies.

Next, the capacitor element is immersed in a solution containing the inventive conductive polymer composite so that a solid electrolyte is formed between the dielectric layer and the cathode foil of the solid capacitor.

The solid capacitor manufactured with the conductive polymer composite according to the present invention exhibits a high withstand voltage and high capacitance and can be used under a voltage of 180V or higher and meet the current demands in industry. Therefore, the solid capacitor can be widely used in industries requiring high-voltage capacitors, for example, drive power supplies for LED lamps, electronic energy-saving lamps and rectifiers, motor electronic devices, computer motherboards, frequency converters, network communications, power supplies for medical devices, and other high-end areas including UPS.

The present invention will be further described by the following examples, which are provided for illustration purposes but not intended to limit the scope of the present invention. Any modifications or alterations that can be easily accomplished by a person skilled in the art fall within the scope of the disclosure of the specification and the appended claims.

EXAMPLES

Preparation of Conductive Polymer Composites

Example 1

1 g

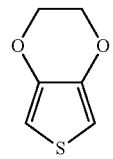

was added to a 100 ml aqueous solution containing 0.3 g polystyrene sulfonic acid [Alfa Acsar, CAS NO: 28210-41-5, 30% aq. Mw: 75000]. The mixture was uniformly stirred and subjected to 30 kHz ultrasonic agitation for 30 min. Thereafter, 1.55 g hydrogen peroxide was added for performing oxidation polymerization so as to form a polymer composite. The resultant polymer composite was subjected to 30 kHz ultrasonic agitation for 30 min again and a conductive polymer composite 1 was obtained.

Example 2

1 g

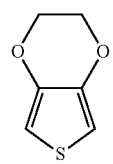

was added to a solution containing 3.3 g polystyrene sulfonic acid. The mixture was uniformly stirred and subjected to 30 kHz ultrasonic agitation for 30 min. Thereafter, 1.55 g hydrogen peroxide was added for performing oxidation polymerization so as to form a polymer composite. The resultant polymer composite was subjected to 30 kHz ultrasonic agitation for 30 min again and a conductive polymer composite 2 was obtained.

Example 3

0.9 g

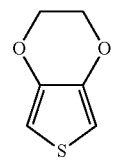

and 0.1 g

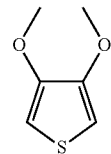

was added to a solution containing 3.3 g polystyrene sulfonic acid. The mixture was uniformly stirred and subjected to 30 kHz ultrasonic agitation for 30 min. Thereafter, 1.55 g hydrogen peroxide was added for performing oxidation polymerization so as to form a polymer composite. The resultant polymer composite was subjected to 30 kHz ultrasonic agitation for 30 min again and a conductive polymer composite 3 was obtained.

Example 4

0.9 g

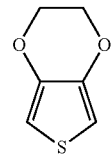

and 0.1 g

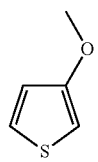

was added to a solution containing 3.3 g polystyrene sulfonic acid. The mixture was uniformly stirred and subjected to 30 kHz ultrasonic agitation for 30 min. Thereafter, 1.55 g hydrogen peroxide was added for performing oxidation polymerization so as to form a polymer composite. The resultant polymer composite was subjected to 30 kHz ultrasonic agitation for 30 min again and a conductive polymer composite 4 was obtained.

Example 5

0.9 g

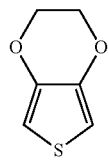

and 0.1 g

was added to a solution containing 3.3 g polystyrene sulfonic acid. The mixture was uniformly stirred and subjected to 30 kHz ultrasonic agitation for 30 min. Thereafter, 1.55 g hydrogen peroxide was added for performing oxidation polymerization so as to form a polymer composite. The resultant polymer composite was subjected to 30 kHz ultrasonic agitation for 30 min again and a conductive polymer composite 5 was obtained.

Example 6

0.9 g

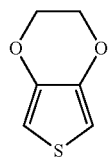

and 0.1 g

was added to a solution containing 3.3 g polystyrene sulfonic acid. The mixture was uniformly stirred and subjected to 30 kHz ultrasonic agitation for 30 min. Thereafter, 1.55 g hydrogen peroxide was added for performing oxidation polymerization so as to form a polymer composite. The resultant polymer composite was subjected to 30 kHz ultrasonic agitation for 30 min again and a conductive polymer composite 6 was obtained.

Example 7

0.9 g

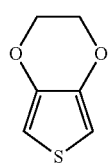

and 0.1 g

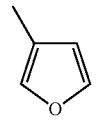

was added to a solution containing 3.3 g polystyrene sulfonic acid. The mixture was uniformly stirred and subjected to 30 kHz ultrasonic agitation for 30 min. Thereafter, 1.55 g hydrogen peroxide was added for performing oxidation polymerization so as to form a polymer composite. The resultant polymer composite was subjected to 30 kHz ultrasonic agitation for 30 min again and a conductive polymer composite 7 was obtained.

Example 8

0.9 g

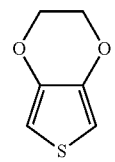

and 0.1 g

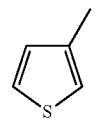

was added to a solution containing 3.3 g polystyrene sulfonic acid. The mixture was uniformly stirred and subjected to 30 kHz ultrasonic agitation for 30 min. Thereafter, 1.55 g hydrogen peroxide was added for performing oxidation polymerization so as to form a polymer composite. The resultant polymer composite was subjected to 30 kHz ultrasonic agitation for 30 min again and a conductive polymer composite 8 was obtained.

Example 9

0.9 g

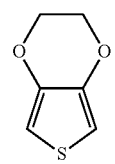

and 0.1 g

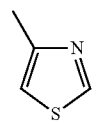

was added to a solution containing 3.3 g polystyrene sulfonic acid. The mixture was uniformly stirred and subjected to 30 kHz ultrasonic agitation for 30 min. Thereafter, 1.55 g hydrogen peroxide was added for performing oxidation polymerization so as to form a polymer composite. The resultant polymer composite was subjected to 30 kHz ultrasonic agitation for 30 min again and a conductive polymer composite 9 was obtained.

Example 10

0.9 g

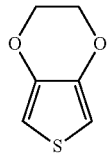

and 0.1 g

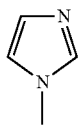

was added to a solution containing 3.3 g polystyrene sulfonic acid. The mixture was uniformly stirred and subjected to 30 kHz ultrasonic agitation for 30 min. Thereafter, 1.55 g hydrogen peroxide was added for performing oxidation polymerization so as to form a polymer composite. The resultant polymer composite was subjected to 30 kHz ultrasonic agitation for 30 min again and a conductive polymer composite 10 was obtained.

Example 11

0.9 g

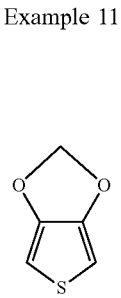

and 0.1 g

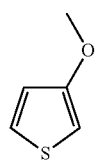

was added to a solution containing 3.3 g polystyrene sulfonic acid. The mixture was uniformly stirred and subjected to 30 kHz ultrasonic agitation for 30 min. Thereafter, 1.55 g hydrogen peroxide was added for performing oxidation polymerization so as to form a polymer composite. The resultant polymer composite was subjected to 30 kHz ultrasonic agitation for 30 min again and a conductive polymer composite 11 was obtained.

Example 12

0.9 g

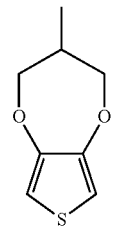

and 0.1 g

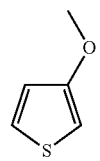

was added to a solution containing 3.3 g polystyrene sulfonic acid. The mixture was uniformly stirred and subjected to 30 kHz ultrasonic agitation for 30 min. Thereafter, 1.55 g hydrogen peroxide was added for performing oxidation polymerization so as to form a polymer composite. The resultant polymer composite was subjected to 30 kHz ultrasonic agitation for 30 min again and a conductive polymer composite 12 was obtained.

Comparative Example 1

1.0 g

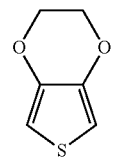

was added to a solution containing 3.3 g polystyrene sulfonic acid. The mixture was uniformly stirred and then 1.55 g hydrogen peroxide was added for performing oxidation polymerization so as to form a comparative conductive polymer composite 1.

Comparative Example 2

1.0 g

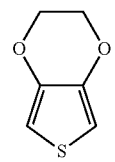

was added to a solution containing 3.3 g polystyrene sulfonic acid. The mixture was uniformly stirred and then 1.55 g hydrogen peroxide was added for performing oxidation polymerization so as to form a polymer composite. The resultant polymer composite was subjected to 30 kHz ultrasonic agitation for 30 min and a comparative conductive polymer composite 10 was obtained.

Comparative Example 3

1.0 g

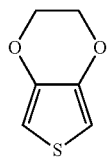

was added to a solution containing 3.3 g polystyrene sulfonic acid. The mixture was uniformly stirred and subjected to 30 kHz ultrasonic agitation for 30 min. Then 1.55 g hydrogen peroxide was added for performing oxidation polymerization so as to form a comparative conductive polymer composite 3.

Tests on Physical Properties of Conductive Polymer Composites

[Molecular Weight]

The conductive polymer composites obtained from the above examples and comparative examples were tested by MALDI-TOF for their molecular weights. The results are shown in Table 1 below.

[Particle Size]

The conductive polymer composites obtained from the above examples and comparative examples were tested by DLS (HORIBA-LB-550) for their particle sizes. The results are shown in Table 1 below.

[Surface Resistivity]

PEDOT:PSS was coated onto a PET film with a coating rod (RDS-5) and tested with Mitsubishi four-point probes. The conductive polymer composites obtained from the above examples and comparative examples were tested for the surface resistivity. The results are shown in Table 1 below.

TABLE 1

|  | Molecular Weight (Mw) | Particle Size (nm) | Surface Resistivity ($\Omega/\square$) |
| --- | --- | --- | --- |
| Example 1 | 5000 | 200 | 270 |
| Example 2 | 9450 | 150 | 240 |
| Example 3 | 12000 | 160 | 300 |
| Example 4 | 11000 | 175 | 600 |
| Example 5 | 14000 | 200 | 720 |
| Example 6 | 13200 | 200 | 330 |
| Example 7 | 16000 | 190 | 660 |
| Example 8 | 10500 | 180 | 420 |
| Example 9 | 11000 | 175 | 570 |
| Example 10 | 10000 | 200 | 750 |
| Example 11 | 7600 | 170 | 510 |
| Example 12 | 7000 | 150 | 570 |
| Comparative Example 1 | 1500 | 3000 | 4500 |
| Comparative Example 2 | 1800 | 1200 | 3900 |
| Comparative Example 3 | 9450 | 500 | 1240 |

Preparation of Solid Capacitor

Solid capacitors using the conductive polymer composites obtained from the above examples and comparative examples were prepared according to the following method:

A capacitor element 9 as shown in FIG. 1 was immersed in a selected conductive polymer composition for 5 min, and taken out the capacitor element 9 which was then being baked with heat. The process was repeated for three times so as to form a solid electrolyte in the capacitor element 9. The solid electrolyte containing capacitor element was disposed in a box with a bottom, and the box was sealed with wires exposed, thus forming a solid capacitor.

Tests on Physical Properties of Solid Capacitors

Various properties of the resultant capacitors were tested and the results are listed in Table 2 below:

Capacitance and Dissipation Factor: determined using HP4284A LCR meter at 20° C. and the frequency of 120 Hz.

ESR: determined using HP4284A LCR meter at 20° C. and the frequency of 100 Hz.

Withstand Voltage: determined by Capacitor Leakage Current/IR Meter Chroma Model 11200.

TABLE 2

|  | Capacitance (CS) (µF, 120 Hz) | Dissipation Factor (DF) | Equivalent Series Resistivity (ESR) (mohm) | Withstand Voltage (volt) |
| --- | --- | --- | --- | --- |
| Example 1 | 5.87 | 0.17 | 1700 | 190 |
| Example 2 | 5.94 | 0.12 | 1300 | 180 |
| Example 3 | 5.49 | 0.13 | 1400 | 230 |
| Example 4 | 4.88 | 0.10 | 1400 | 210 |
| Example 5 | 5.01 | 0.12 | 1560 | 200 |
| Example 6 | 5.12 | 0.10 | 1420 | 218 |
| Example 7 | 4.96 | 0.08 | 1200 | 206 |
| Example 8 | 4.20 | 0.15 | 1350 | 203 |
| Example 9 | 4.77 | 0.17 | 1720 | 198 |
| Example 10 | 5.12 | 0.16 | 985 | 220 |
| Example 11 | 5.10 | 0.12 | 1300 | 185 |
| Example 12 | 5.26 | 0.10 | 1456 | 186 |
| Comparative Example 1 | 1.50 | 0.14 | 4200 | 164 |
| Comparative Example 2 | 1.60 | 0.16 | 3500 | 170 |
| Comparative Example 3 | 1.75 | 0.10 | 3200 | 175 |

As can be seen from the test results of Example 1 and Example 2, when only the monomer of formula (I) is used for the polymerized units, the resultant polymer composite already exhibits excellent polymer properties and high withstand voltage properties.

A comparison between Comparative Example 2 and Examples 3-10 reveals that if the monomer of formula (II) is further used as the polymerized units, the degree of polymerization of a resultant polymer composite can be further enhanced and the composite will exhibit better polymer properties and higher withstand voltages.

As can be seen from the test results of Examples 11 and 12, when different monomers of formula (I) and formula (II) are used, the resultant polymer composites also exhibit excellent polymer properties and high withstand voltage properties.

A comparison between Comparative Example 1 and Comparative 3 reveals that if no ultrasonic agitation or only one-time ultrasonic agitation is used in the process for preparing a conductive polymer composite, the resultant composite would encounter the drawback of exhibiting an overly large particle size or low degree of polymerization, resulting in worse polymer properties and lower withstand voltages.

What is claimed is:

1. A process for preparing a conductive polymer composite, comprising the steps of:

(a) mixing a monomer of formula (I):

(I)

and
optionally a monomer of formula (II):

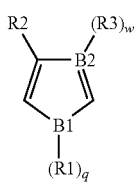
(II)

with a polyanion,
wherein:
A is a $C_{1-4}$ alkylene substituted by $(R)_p$, where R is independently H, unsubstituted or substituted $C_{1-20}$ alkyl or alkoxy, or unsubstituted or substituted $C_{6-20}$ aryl, and p is 0, 1 or 2,
X is O or S,
B1 is O, S or N,
B2 is N or C,
R1, R2 and R3 each independently represent H, unsubstituted or substituted $C_{1-20}$ alkyl or alkoxy, or unsubstituted or substituted $C_{6-20}$ aryl, and
q and w each independently represent an integer of 0 or 1;
(b) subjecting the mixture obtained from step (a) to a first ultrasonic agitation to form micelles;
(c) adding an oxidant so that the monomers can undergo oxidation polymerization on the polyanion which serves as a template so as to form a composite with the polyanion; and
(d) subjecting the composite with the polyanion formed in step (c) to a second ultrasonic agitation to form the conductive polymer composite with a weight average molecular weight ranging from 3,000 to 30,000.

2. The process according to claim 1, wherein the frequencies of the first ultrasonic agitation and the second ultrasonic agitation range from about 10 kHz to about 50 kHz.

3. The process according to claim 1, wherein the oxidant is iron p-toluenesulfonate or hydrogen peroxide.

4. The process according to claim 1, wherein the oxidant is used in an amount of about 5 parts by weight to about 3000 parts by weight, based on 100 parts by weight of the total amounts of the monomers used.

5. The process according to claim 1, wherein the oxidation polymerization is conducted at a temperature ranging from 20° C. to 80° C.

6. The process according to claim 1, wherein the second ultrasonic agitation reduces a particle size of the composite formed in step (c) such that the conductive polymer composite has a particle size of less than 500 nm.

7. The process according to claim 1, wherein the second ultrasonic agitation reduces a particle size of the composite formed in step (c) such that the conductive polymer composite has a particle size in a range of about 10 nm to 400 nm.

8. The process according to claim 1, wherein the second ultrasonic agitation reduces a particle size of the composite formed in step (c) such that the conductive polymer composite has a particle size in a range of about 30 nm to 300 nm.

9. The process according to claim 1, wherein the second ultrasonic agitation reduces a particle size of the composite formed in step (c) such that the conductive polymer composite has a particle size in a range of about 50 nm to 200 nm.

* * * * *